Jan. 5, 1971     C. N. CAUSEY     3,553,578
PHASE ANGLE MEASURING CIRCUIT OF A TYPE DEVELOPING SQUARE
WAVE D.C. PULSES REPRESENTING THE PHASE
ANGLE WITH IMPROVEMENTS THEREIN
Filed Dec. 28, 1966     2 Sheets-Sheet 2

United States Patent Office 3,553,578
Patented Jan. 5, 1971

3,553,578
PHASE ANGLE MEASURING CIRCUIT OF A TYPE DEVELOPING SQUARE WAVE D.C. PULSES REPRESENTING THE PHASE ANGLE WITH IMPROVEMENTS THEREIN
Cloy N. Causey, Houston, Tex., assignor to Texaco Inc., New York, N.Y., a corporation of Delaware
Filed Dec. 28, 1966, Ser. No. 605,358
Int. Cl. G01r 25/00
U.S. Cl. 324—83                                    6 Claims

ABSTRACT OF THE DISCLOSURE

A phase angle measuring circuit employing two channels one for each of two signals having the same frequency but varying in relative phase. The channels each have direct coupled transistor stages with differential input and single ended output circuits. Each channel provides high gain clipped amplification causing square wave outputs. Both channels feed into a comparison circuit that provides square wave output which depends upon phase coincidence so that the average value of the output is proportional to the phase angle from zero to maximum.

CROSS-REFERENCES TO RELATED APPLICATIONS

This invention is particularly applicable to use in connection with a torque meter, e.g., one such as that disclosed in copending application Ser. No. 333,849 filed Dec. 27, 1963, now Pat. No. 3,295,367 issued Jan.. 3, 1967. Such torque meter is especially applicable to oil well drilling operations, and provides for a pair of alternating current generators mounted spaced apart along a stiff shaft. The change in phase angle between the output voltages of these two generators is proportional to the torque in the stiff shaft. The speeds of operation will vary from quite slow to a considerable r.p.m. and consequently, the output voltages from the generators will vary substantially in amplitude as well as in the frequency thereof.

BACKGROUND OF THE INVENTION

Field of the invention

This invention concerns a phase angle measuring circuit in general. More specifically, the invention relates to an improved circuit for measuring the phase angle between two signals of the same frequency but varying in relative phase, which includes a pair of direct coupled transistor amplifier channels having differential inputs and single ended outputs.

DESCRIPTION OF THE PRIOR ART

Heretofore, one type of phase measuring circuit involved a diode bridge circuit. However, this necessitated the use of a substantial difference in amplitude between the signals, the phase relationship of which was being measured.

Another prior system made use of circuits employing vacuum tube elements. Consequently, it required the higher voltages and greater power consumption that goes with vacuum tubes.

SUMMARY OF THE INVENTION

Briefly, this invention relates to a phase angle measuring circuit having means for comparing two signals of the same frequency but varying in relative phase. The measuring circuit also has means for developing square wave DC pulses having a constant amplitude the average value of which is proportional to the phase angle between said signals. In the foregoing phase angle measuring circuit the invention relates to the improvement comprising a pair of direct coupled transistor amplifier channels including a differential input circuit and a single ended output circuit for each channel.

Again briefly, the invention concerns a phase angle measuring circuit according to the foregoing wherein said amplifier channels each include both a positive and a negative voltage supply, and wherein successive stages in both said channels are arranged with the collectors at increasingly lower voltages. The system also comprises circuit means in one of said amplifier channels, which circuit means includes an unbalancing resistor connected to one side of the differential first stage of said one amplifier channel.

BRIEF DESCRIPTION OF THE DRAWING

The foregoing and other objects and benefits of the invention will be more fully set forth below in connection with the best mode contemplated by the inventor of carrying out the invention, and in connection with which there are illustrations provided in the drawings wherein.

DESCRIPTION OF THE PREFERRED EMBODIMENT

Figure 1B:
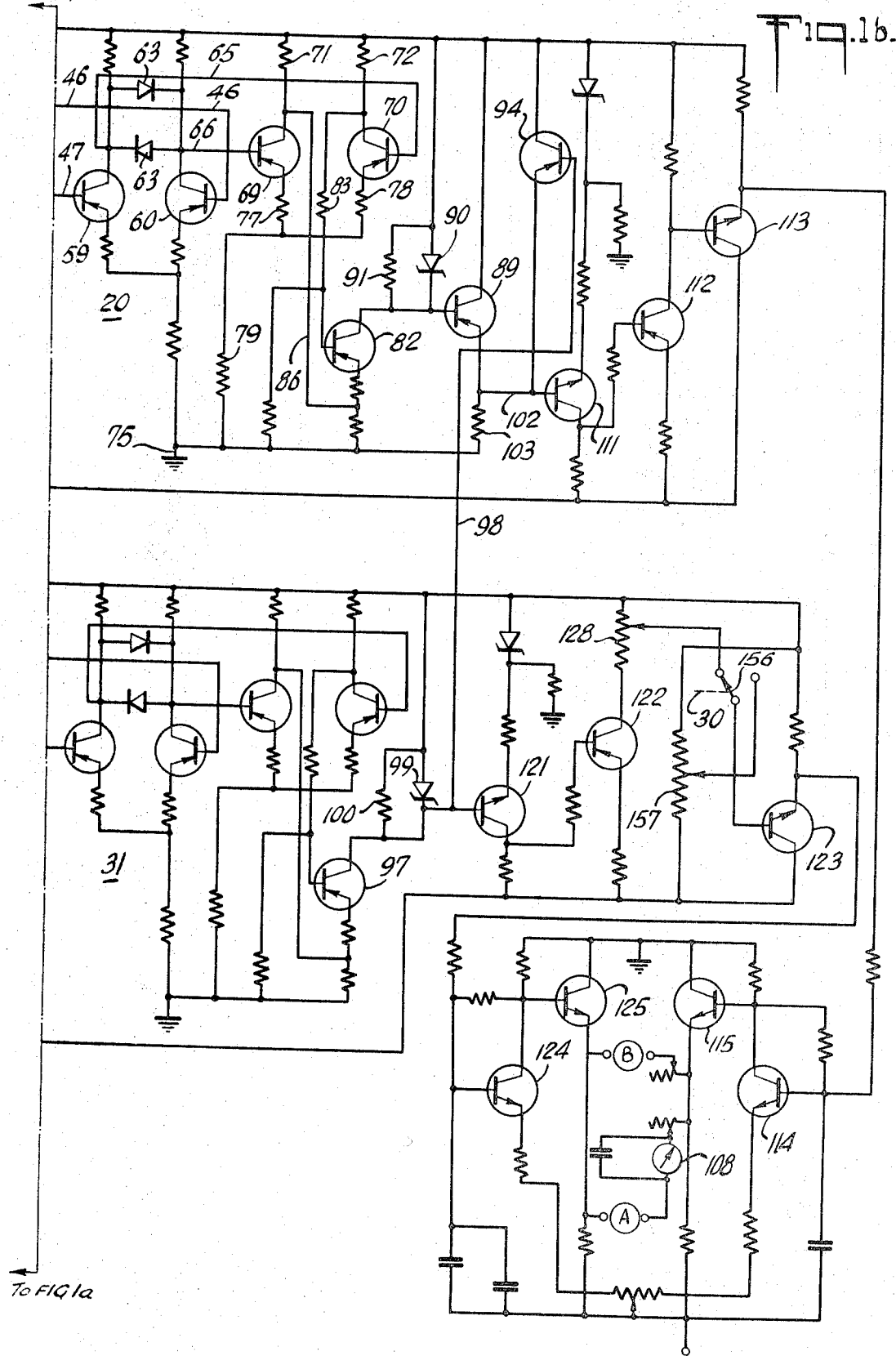
FIG. 1a and FIG. 1b together show a circuit diagram illustrating a particular circuit according to the invention.
Figure 1A:
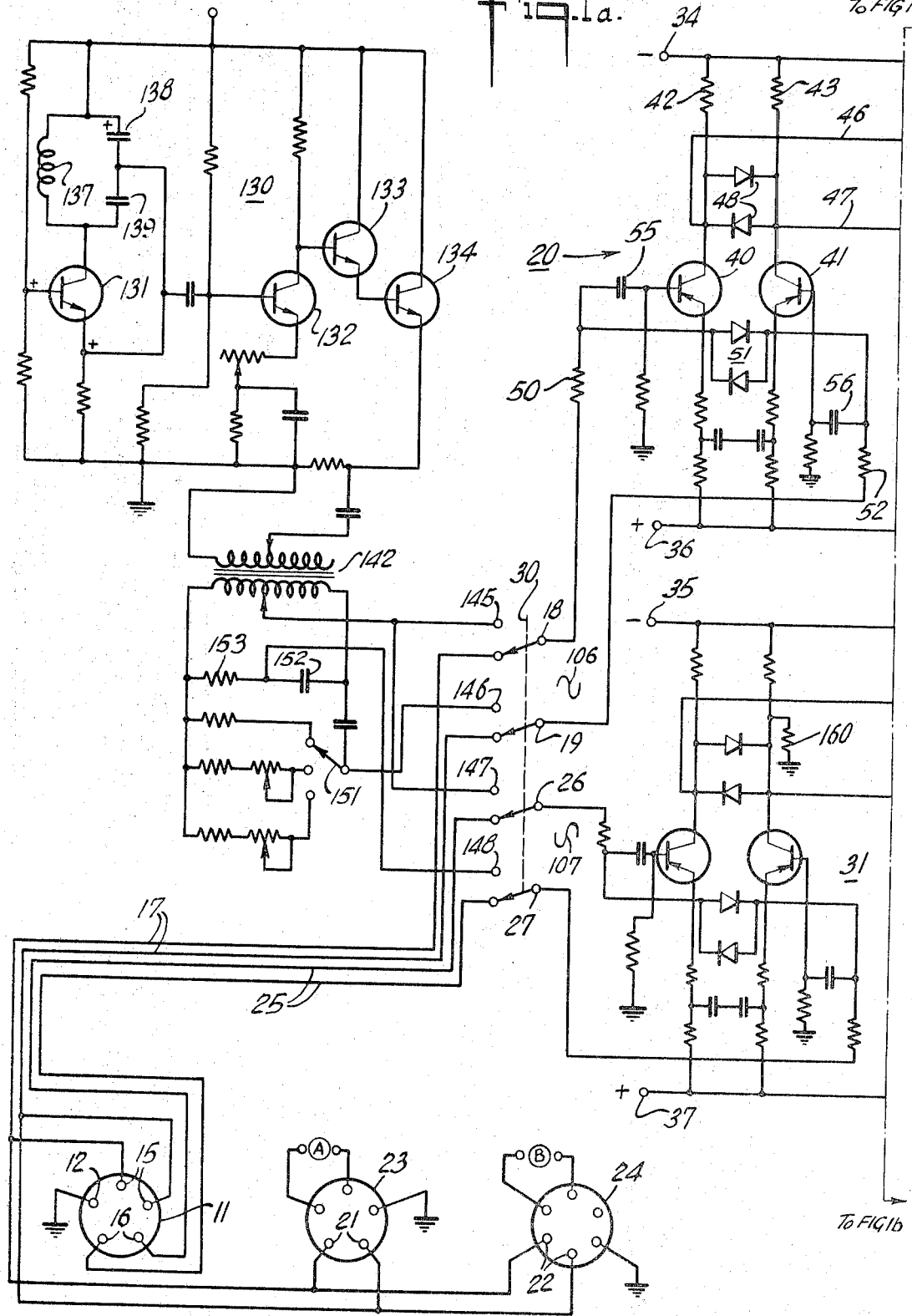

Referring to FIG. 1a, it is pointed out that there is an electrical connector 11 in the lower left hand corner. This has five terminals for introducing signals from external sources. A terminal 12 is grounded as illustrated in order to provide an internal ground circuit for accommodating various grounding conditions relative to whatever is generating the input signals.

As indicated above, the input signals may be developed from the two axially spaced AC generators of a torque meter, if such is to be the source of input signals for the phase comparator system. These signals will be connected to each of two pairs of the remaining terminals on the connector 11, e.g., a pair of terminals 15 for one AC signal and another pair of terminals 16 for the other AC signal.

It will be observed that the terminals 15 are connected via a pair of circuit wires 17 to input terminals 18 and 19 for an amplifier channel 20. Also, terminals 15 are connected to a pair of terminals 21 and 22 on each of two connectors 23 and 24, respectively. These provide for carrying the signals introduced at terminals 15 to each of two remote locations where for example there may be an instrument panel and a recorder. In each case these signals (which are taken from one of the AC generators on the torque meter mentioned above) are employed to provide an indication of the speed, i.e., r.p.m. of the torque meter.

The other pair of terminals 16 are connected by a pair of circuit wires 25 to a corresponding pair of amplifier channel input terminals 26 and 27. In this case, as is the case with the connections from the terminals 15 to input terminals 18 and 19, the circuits are completed via a multipole double throw switch 30 to the inputs of the amplifier channels. Switch 30 is employed in order to put calibration signals into the system when desired. The input terminals 26 and 27 are for an amplifier channel 31 that corresponds to the first channel 20 to which the input terminals 18 and 19 apply.

It is to be noted that the supply voltages applied to both amplifier channels 20 and 31 include a negative voltage supply as well as a positive voltage supply and this is indicated by the minus and plus symbols adjacent to each of supply voltage terminals 34, 35 and 36, 37, respectively. This provides among other things a flexibility with regard to grounding conditions since internal ground circuits will be at a neutral or zero potential. This has a real advantage where the input signals are those derived from a torque meter such as that mentioned by way of illustration, because it may have various grounding conditions and thus need a flexible arrangement for avoiding stray signal inputs.

The elements of each of the amplifier channels 20 and 31 are substantially identical, with an exception that will be described in more detail below, and thus the description of elements in channel 20 will suffice to clearly explain both channels.

The first stage of amplification in channel 20 employs a pair of transistors 40 and 41 that have the collector of each connected to the negative voltage supply from terminal 34, via resistors 42 and 43, respectively. Also connected to the collectors are output circuit connections 46 and 47 that have connected therebetween a pair of oppositely poled diodes 48. These diodes act as a limiter for the amplitude of the output signals from the pair of transistors 40 and 41.

The emitters of transistors 40 and 41 are connected via the illustrated resistors to the positive voltage supply terminal 36 and the values of these resistors will be predetermined in conjunction with the values of resistors 42 and 43 so as to provide desired working conditions for the operation of the transistors. One criterion is to set the collector voltages high enough to allow for having the collectors of succeeding stages at increasingly lower voltages. This permits direct coupling which will minimize phase shift within the amplifier.

It will be observed that the input signal connection to channel 20 is applied differentially to the transistors 40 and 41, via a circuit that leads from the input terminal 18 through a resistor 50 to one side of a pair of oppositely connected diodes 51 and then through another resistor 52 to the other input terminal 19, to complete the circuit. Of course, the input to each transistor 40 and 41 is included. Thus, this differential input circuit goes to the base of each transistor 40 and 41 via capacitors 55 and 56 respectively.

It will be noted that the pair of diodes 51 provides limiting action to shunt input signals that exceed a predetermined maximum while, as already pointed out above, the output signals are similarly limited in the maximum amplitude thereof by reason of the other pair of diodes 48.

The output signals from the first stage, i.e., from transistors 40 and 41 are connected via the above indicated circuit connections 46 and 47 to the inputs of another differentially connected pair of transistors 59 and 60. It will be observed that these connections are direct to the base of each transistor and consequently, no internal phase shift is created. Such direct coupling is made possible by the use of both the negative and positive voltage supplys for the amplifier channels. This allows the circuit constants to be arranged in such a way as to have the bias voltages such that collectors of this second stage of transistors operate at a lower voltage than the collectors of the transistors 40 and 41.

In the second amplifier stage (transistors 59 and 60) there is another pair of oppositely poled diodes 63. As with diodes 48 in the first stage, these diodes 63 provide a limiting action to avoid any amplitude signal above a given level.

The output connections from transistors 59 and 60 go via circuit connections 65 and 66 respectively to the inputs of the next stage of amplification. Such next stage comprises a pair of transistors 69 and 70. They have the collectors thereof connected to the negative voltage supply terminal 34 via a pair of resistors 71 and 72, respectively, while the emitters are connected to ground via separate resistors 77 and 78 that join a common circuit going through another resistor 79 on the way to a ground connection 75.

It will be observed that the output of the third stage transistors 69 and 70 becomes single ended. It is applied across the input of a single transistor 82. This input is via a resistor 83 and goes across the base-to-emitter circuit of transistor 82. The collector of transistor 69 is connected to the emitter circuit of transistor 82 by a circuit connection 86.

The output of transistor 82 goes to the input of a transistor 89. This includes another signal amplitude limiter which is a Zener diode 90 that is in parallel with a resistor 91.

Transistor 89 and another similarly employed transistor 94 act together as a comparison circuit for the outputs of amplifier channels 20 and 31, respectively. Thus, it will be observed that there is a transistor 97 at the output (single ended) of amplifier channel 31. This is the counterpart for the transistor 82 of channel 20. The output of transistor 97 is applied to the base of transistor 94 via a circuit connection 98 in conjunction with another Zener diode 99 and resistor 100 in the same manner as was the case with the output of the transistor 82. This, of course, will limit the amplitude of the channel 31 output similarly as was the case with Zener diode 90 in amplifier channel 20.

The comparison circuit includes transistors 89 and 94 and acts to provide at the output thereof pulses of a constant amplitude and substantially square wave in form. These will have an average value proportional to the phase angle between the two input signals as they are applied to the channels 20 and 31 via the input terminal pairs 18, 19 and 26, 27, respectively. This is accomplished in the following manner.

The emitters of comparison transistors 89 and 94 are connected in common over a circuit connection 102 and to one end of a resistor 103 which has the other end thereof connected to ground via ground connection 75. Because of the high gain of the amplifier channels and the limiting effect of the Zener diodes 90 and 99, the outputs of the amplifier channels 20 and 31 respectively, can be only at one of two voltage levels, i.e., the negative supply voltage level as determined at the terminal 34, or a predetermined lesser negative voltage as determined by the circuit constants in the amplifier channels. Which one it will be is determined by the polarity of the input signal to the amplifier channel in each case. The comparison circuit, i.e., transistors 89 and 94, acts such that the emitters (i.e., circuit connection 102) will remain at the negative supply voltage level as long as either amplifier channel output is at that voltage. However, the instant that both outputs go to the lesser negative voltage, then the emitters of the comparison transistors will hold this new voltage until either or both of the amplifier channel outputs return to the negative supply voltage level. Thus, in computer logic terminology the transistors 89 and 94 form an "and" circuit. This then provides the square wave output pulses having the desired characteristics, as indicated above.

It will be noted that in order to have the output zero when the amplifier channel input signals are exactly in phase, one of the input signals must be inverted. This relatively inverted state is indicated by the wave form signal symbols 106 and 107 that are shown adjacent to the input terminals 18, 19 and 26, 27 for the amplifier channels 20 and 31, respectively. It will be appreciated that the inversion of one of the input signals is easily accomplished by merely having the leads (not shown) from one of the generator inputs, e.g., either the leads coming into input terminals 15 or into terminals 16, reversed.

There is an output circuit for the phase angle measuring system, that provides output at terminals marked "A" and "B." These outputs are proportional to the average value of the comparison circuit pulses. These outputs provide signals to deflect a panel meter 108 as well as to drive external recorders and meters via the connectors 23 and 24.

The output of the comparison circuit goes through a plurality of stages of amplification provided by a series of transistors 111, 112, 113, 114 and 115. This terminates at one side of the system output circuit described above.

In the particular use of the invention being described, i.e., where the inputs to the phase comparison circuit are the outputs of the generators going to make up a torque meter of the type indicated above, it is virtually impossible to have the structure of the torque meter such that the output of the generators are exactly in phase when there is no torque. Therefore, in order to offset or cancel out a phase difference output at zero torque, there is a provision for introducing a nulling signal that is in opposition to the amplified output of the comparison circuit. This nulling voltage is developed by taking the output of amplifier channel 31 and amplifying it over a series of transistors 121, 122, 123, 124 and 125. The amplitude of this nulling signal is determined by adjustment of a potentiometer 128 that is connected between the output of transistor 122 and the input of transistor 123 (so long as the switch 30 is in the operating position). It will be appreciated that potentiometer 128 will be adjusted to null the output from the comparison circuit of transistors 89 and 94 when the torque meter is operating under zero torque conditions. This may be considered as developing a so-called zero offset signal.

A calibration circuit is provided in order to make calibration checks on the instrument after it has been installed and at any time that it may be desired during the operation thereof. Such calibration circuit entails the provision of an oscillator having a plurality of phase shift networks connected to the output thereof for providing calibration signals.

Referring to FIG. 1a, it will be observed that there is an oscillator 130 that includes four transistors 131–134 and tank circuit made up of a coil 137 and two capacitors 138 and 139. The oscillator output is fed via a transformer 142 to the phase shift networks illustrated. These networks provide for a pair of output signals having predetermined phase shift therebetween. Such signals will appear at the pair of terminals 145 and 146 for one signal and at terminals 147 and 148 for the other signal. It will be observed that terminals 145 and 147 are connected together and to the central tap on the secondary of transformer 142. Terminal 146 is connected to the multiple position arm of a switch 151 while the terminal 148 is connected to the mid-point between a capacitor 152 and a resistor 153 that are connected in series across the ends of the secondary of transformer 142.

The calibration signals from the output of the oscillator 130 will be connected into the inputs of the amplifier channels 20 and 31 when the switch 30 is shifted to the opposite position from that illustrated, i.e., when terminals 145, 146, and 147, 148 are connected to the input terminals 18, 19 and 26, 27, respectively. At the same time, it will be noted that switch 30 includes another arm 156 (FIG. 1b) that will shift the input connection for transistor 123 from the potentiometer 128 to another potentiometer 157 that provides a so-called zero set voltage. This zero set voltage is for adjusting the zero setting under calibration conditions when the switch 151 is at zero phase angle.

Because of the high gain amplification involved in the amplifier channels 20 and 31, and the fact that given transistor pairs will usually not be exactly matched; there will tend to be a spurious output signal in the absence of an input signal. This might be in either of the amplification channels. Consequently, in order to insure a zero reading at the output of the phase measuring system when there is an absence of input signals, there is provided a circuit means connected to one of the amplifier channels (which in this case is channel 31) that will predetermine the output state of that channel under no signal input conditions. This is an unbalancing resistor 160 (FIG. 1a) connected to the collector circuit of one of the transistor pair at the first stage in channel 31. This acts so as to bias that transistor enough to insure that the output from transistor 97 (at the ouput of channel 31) will remain with its collector at the voltage level of the negative supply terminal 35 which represents a zero signal input condition. Therefore, the output of the phase comparator circuit will be always at zero on account of the operation of the comparison circuit which, as explained above, is in effect an "and" circut. For the foregoing reasons, it does not matter which of the two possible states the other amplifier channel 20 happens to be in, there still will be a zero output from the system.

OPERATION

When the switch 30 is in the operating position (that illustrated), the pair of signals from the torque meter are connected from the connector 11 to the differential inputs of amplifier channels 20 and 31. These channels end with single ended outputs that feed the comparison circuit of transistors 89 and 94, and the outputs of the channels are square wave pulses having the same phase as the torque meter signals but with one inverted. Then the comparison circuit produces at its output 102, square wave pulses having a duration in accordance with the phase angle from zero to a predetermined maximum.

Since the torque meter signals will have at least some phase angle at zero torque, a zero offset signal is developed by taking the output from channel 31 and adjustably amplifying it by the transistors 121, 122, etc. Then after the output of the comparison circuit has been amplified by transistors 111, 112, etc., the zero offset signal is applied in opposition and the outputs at terminals A, B and meter 108 will be the desired indication of torque.

When it is desired to calibrate the output meters and/or recorders, the switch 30 is shifted to the other position from that illustrated and then the oscillator outputs are connected as determined by the position of the multiposition switch 151. Whatever phase angle has been set will then be fed via the switch 30 to the inputs of the amplifier channels 20 and 31. At the same time the additional arm 156 of switch 30 will connect for providing a steady state adjustable signal to oppose the comparison circuit output amplified in place of the nulling signal that is developed from the channel 31 of the amplifier channels. Thus, under calibration conditions, the switch 151 may be set to introduce predetermined phase angle signals from zero to any given maximum by steps as desired.

While a particular embodiment of the invention has been described above in considerable detail in accordance with the applicable statutes, this is not to be taken as in any way limiting the invention but merely as being descriptive thereof.

What is claimed is:

1. In a phase angle measuring circuit including a pair of amplifier channels one for each of a pair of signals both having substantial amplitude and frequency variation and the phase of each of which is to be compared with the other and said circuit having means for comparing said two signals of the same frequency but varying in relative phase, and said circuit including means for developing square wave D.C. pulses having a constant amplitude the average value of which is proportional to the phase angle between said signals, the improvement comprising:
   multistage direct coupled transistor amplifiers in said channels one for each of said pair of signals and each including a differentially applied input circuit having two sides and a single ended output circuit, said transistors having collectors and
   circuit means in an early one of said multistages of only one of said amplifiers in said channels for predetermining the output state of said channel under no input signal conditions whereby none of said D.C. pulses will appear under no signal conditions.

2. The invention according to claim 1 further comprising:

circuit means connected to the output circuit of one of said channels for providing an adjustable amplitude square wave D.C. pulse type signal for use in nulling a phase angle signal from said measuring circuit.

3. The invention according to claim 2, further comprising means for generating calibration input signals and including switch means for removing said adjustable amplitude nulling signal circuit means during calibration.

4. The invention according to claim 1 wherein said amplifiers in said channels each have both a positive and a negative voltage supply, and wherein successive stages in both said channels are arranged with the collectors at increasingly lesser voltages relative to said voltage supply.

5. The invention according to claim 4, further comprising:

circuit means in an early one of said multistages of only one of said amplifiers in said channels for predetermining the output state of said channel under no input signal conditions whereby none of said D.C. pulses will appear under no signal conditions.

6. The invention according to claim 5, wherein said circuit means in an early one of said multistages comprises an unbalancing resistor connected to one side of the differentially applied first stages of said amplifier in one of said channels.

References Cited

UNITED STATES PATENTS

| | | | |
|---|---|---|---|
| 3,096,480 | 7/1963 | Pihl | 324—83(A) |
| 3,177,428 | 4/1965 | Klayman | 324—83(A)X |
| 3,219,938 | 11/1965 | Greening | 324—83(A)UX |
| 3,252,089 | 5/1966 | Nye, Jr. | 324—78(I) |

OTHER REFERENCES

Frater: "A Precision Phase Meter," IEEE Transactions on Instrumentation and Measurement, vol. IM15, No. 1–2, March-June, 1966, pp. 9–19.

Gardner: IBM Tech. Disel. Bull., vol. 7, No. 9, Feb. 9, 1965.

ALFRED E. SMITH, Primary Examiner